US008419243B2

(12) United States Patent
Flandre et al.

(10) Patent No.: US 8,419,243 B2
(45) Date of Patent: Apr. 16, 2013

(54) LED CONTROL DEVICE FOR A VEHICLE LIGHT

(75) Inventors: Loic Flandre, Saint Maur des Fosses (FR); Stephane Richard, Drancy (FR); Benjamin Touzet, Paris (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 13/007,427

(22) Filed: Jan. 14, 2011

(65) Prior Publication Data

US 2011/0163690 A1 Jul. 7, 2011

Related U.S. Application Data

(62) Division of application No. 11/737,230, filed on Apr. 19, 2007, now Pat. No. 7,871,187.

(30) Foreign Application Priority Data

Apr. 20, 2006 (FR) ..................................... 06 03521

(51) Int. Cl.
*B60Q 1/00* (2006.01)

(52) U.S. Cl.
USPC ...... 362/464; 362/249.05; 362/276; 340/531; 315/82; 315/159; 315/308

(58) Field of Classification Search ............. 362/249.05, 362/276, 464–466; 340/531; 315/82, 129, 315/136, 194, 297, 308, 309
See application file for complete search history.

(56) References Cited

U.S. PATENT DOCUMENTS

| | | | | |
|---|---|---|---|---|
| 5,095,502 | A | 3/1992 | Finzel | |
| 6,204,615 | B1 | 3/2001 | Levy | |
| 6,465,962 | B1 | 10/2002 | Fu et al. | |
| 6,608,453 | B2 | 8/2003 | Morgan et al. | |
| 6,897,623 | B2 | 5/2005 | Yoneda et al. | |
| 6,975,214 | B2 | 12/2005 | Schleicher | |
| 7,132,805 | B2 | 11/2006 | Young | |
| 7,871,187 | B2 * | 1/2011 | Flandre et al. | 362/464 |
| 2002/0047628 | A1 | 4/2002 | Morgan et al. | |
| 2004/0056774 | A1 | 3/2004 | Schleicher | |
| 2004/0090189 | A1 | 5/2004 | Yoneda et al. | |
| 2006/0028155 | A1 | 2/2006 | Young | |
| 2007/0040518 | A1 | 2/2007 | Young | |
| 2008/0055896 | A1 | 3/2008 | Feldmeier | |

FOREIGN PATENT DOCUMENTS

| | | | |
|---|---|---|---|
| EP | 319440 | A1 | 6/1989 |
| EP | 430836 | A1 | 6/1991 |
| EP | 952757 | A2 | 10/1999 |
| EP | 1244334 | A2 | 9/2002 |
| EP | 1379108 | A1 | 1/2004 |
| EP | 1411750 | A2 | 4/2004 |
| EP | 1480497 | A2 | 11/2004 |

* cited by examiner

*Primary Examiner* — Stephen F Husar
(74) *Attorney, Agent, or Firm* — Jacox, Meckstroth & Jenkins

(57) ABSTRACT

The invention relates to a device for controlling diode lamps comprising a lighting module having
- at least one diode lamp, the diode lamp pertaining to a predefined range,
- at least one device for transmitting a unique signature representing the range, and an associated control module comprising
- reception means (for receiving a unique signature transmitted by the lighting module, and
- current adjustment means for adjusting and supplying, as a function of the transmitted signature, a current to said lighting module to cause the diode lamp to operate.

5 Claims, 3 Drawing Sheets

LED CONTROL DEVICE FOR A VEHICLE LIGHT

CROSS REFERENCE TO RELATED APPLICATIONS

This application is a division of Ser. No. 11/737,230 filed Apr. 19, 2007, now issued as U.S. Pat. No. 7,871,187, which claims priority to French application Serial No. 0603521 filed Apr. 20, 2006, which applications are incorporated herein and made a part hereof.

FIELD OF THE INVENTION

The present invention relates to a device for controlling diode lamps for a vehicle light device, the diode lamp pertaining to a predefined range of diode lamps. It also relates to a diode lamp lighting module, to a module for controlling diode lamps arranged in a control device of this type, and to a light device incorporating a control device of this type.

The term "vehicle light device" refers to a lighting or signaling device.

DESCRIPTION OF THE RELATED ART

According to a first known prior art, a control device of this type comprises:

a lighting module on which there are arranged one or more diode lamps from a predefined range, and an associated set of resistors; and an electronic card allowing automatic current control of the lighting module via the set of resistors in order to cause the diode lamps to operate correctly. The current injected into the lighting module is thus regularly compared and adjusted as a function of a reference current derived from a current source.

A solution of this type has the following drawback: the automatic current control (the current reference and the injected current) is sensitive to electromagnetic disturbances, and this reduces the precision of the reference current and the losses in the current applied to the diode lamps, resulting in impaired operation of the diode lamps.

According to a second known prior art, the resistors are arranged on the electronic card connected to the lighting module and joined together by a plurality of links connecting a plurality of connectors so as to produce the appropriate currents for the range of diode lamps present in the lighting module.

A solution of this type has the following drawbacks:

it requires a corresponding number of connectors on the electronic card, and this increases the material costs and price, and either the lighting module or the link used for connecting this module to the electronic card has to be configured in a specific manner.

What is needed, specifically, is a system and method that remedies one or more of the drawbacks in the prior art.

SUMMARY OF THE INVENTION

The present invention remedies these drawbacks of the prior art.

It relates, according to a first subject-matter, to a device for controlling at least one diode lamp for a vehicle light device, the diode lamp pertaining to a predefined range of diode lamps, comprising:

at least one lighting module comprising:

at least one diode lamp, at least one device for transmitting a unique signature representing the predefined range of the diode lamp, and means for receiving a current for powering said diode lamp, the current being determined as a function of the unique signature;

and a control module comprising:

reception means for receiving a unique signature transmitted by the lighting module, current adjustment means for adjusting and supplying, as a function of the transmitted signature, the current to the lighting module to cause the lamp to operate, wherein the unique signature transmitted by the transmission device is an analog frequency signal, a digital signal or a pulse width modulation signal.

According to non-limiting embodiments, the control device has the following additional features:

The lighting module and the control module are remote from each other and cooperate via a communication beam.

The control device further comprises a second lighting module and the control module is intended to receive a second signature representing the predefined range of the diode lamp of the second lighting module.

The invention relates, according to a second subject-matter, to a lighting module comprising at least one diode lamp for a vehicle light device, the diode lamp pertaining to a predefined range of diode lamps, comprising:

at least one device for transmitting a unique signature representing the predefined range of the diode lamp, means for receiving a current for powering the diode lamp, the current being determined as a function of the unique signature, wherein the unique signature transmitted by the transmission device is an analog frequency signal, a digital signal or a pulse width modulation signal.

According to non-limiting embodiments, the lighting module comprises the following additional features:

The transmission device is a microcontroller.

The unique signature is transmitted for switching on the lighting module.

The transmission device uses a direct single-line link for transmitting the unique signature.

The transmission device uses a multiple-line link for transmitting the unique signature.

The transmission device is intended further to transmit an item of information concerning a configuration of the diode lamps to be adopted.

The lighting module further comprises a temperature sensor.

In this case, the unique signature is chosen also as a function of the temperature provided by the temperature sensor.

The lighting module cooperates with a control module via a communication beam, the control module being intended to receive the unique signature and to adjust and supply a current to the lighting module as a function of the transmitted signature.

The transmission device is powered with the supply current of the diode lamp.

The invention relates, according to a third subject-matter, to a module for controlling a lighting module comprising at least one diode lamp pertaining to a predefined range of diode lamps, comprising:

reception means for receiving a unique signature transmitted by the lighting module and representing the predefined range, and current adjustment means for adjusting and supplying, as a function of the transmitted signature, a current to the lighting module (10) to cause the lamp to operate, wherein the unique signature transmitted by the transmission device is an analog frequency signal, a digital signal or a pulse width modulation signal and in that it cooperates with the lighting module via a communication beam.

According to non-limiting embodiments, the reception means also allow the transmitted unique signature to be converted into a reference voltage value intended to be used by the current adjustment means and the current adjustment means comprise a voltage-to-current converter and a comparator. Furthermore, the current adjustment means allow a current to be supplied to a transmission device of the control module intended to transmit the unique signature.

The invention relates, according to a fourth subject-matter, to a vehicle light device incorporating a control device according to the preceding features, and in which a control module is located behind the light device, whereas a lighting module is located in front.

As will be seen in greater detail hereinafter, this unique signature associated with a predefined range of diode lamps means that the electronic card and, more particularly, the control module no longer have to be configured in a specific manner for a lighting module (it will be standard), and there are no longer disruptive electromagnetic disturbances, since there are no longer any resistors combined to supply the appropriate current nor a current feedback loop.

These and other objects and advantages of the invention will be apparent from the following description, the accompanying drawings and the appended claims.

BRIEF DESCRIPTION OF THE DRAWINGS

Further features and advantages of the present invention will be better understood from the description and the drawings, in which.

DETAILED DESCRIPTION OF NON-LIMITING EMBODIMENTS OF THE INVENTIONS

Figure 1:
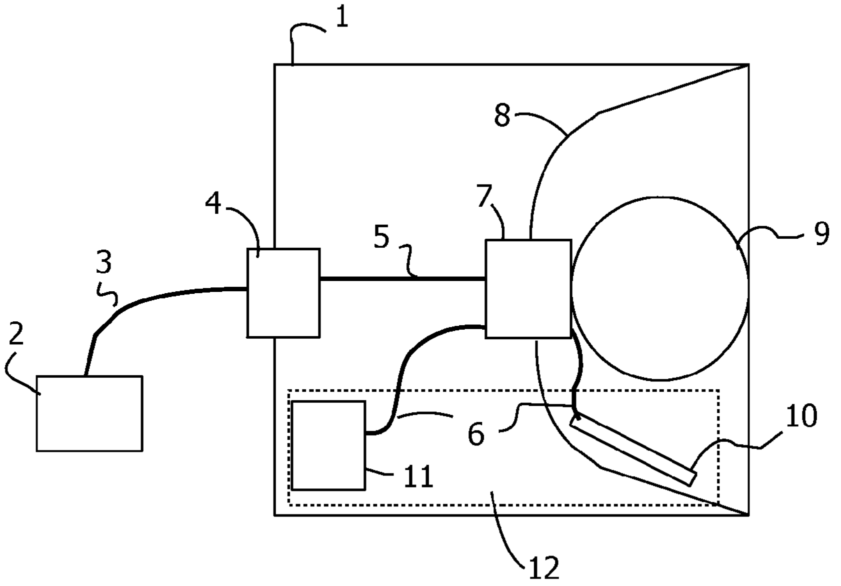
FIG. 1 shows schematically a light equipped with a control device according to the invention.

FIG. 1 shows schematically a vehicle light equipped with a control device 12 according to the invention. The term "vehicle light" refers, in particular, to a lighting or signaling device.

The following example will take the example of a headlamp (corresponding to a lighting device).

The headlamp 1 comprises in a non-limiting manner:

a halogen-type lamp 9 enclosed in a housing and arranged in a given geometric configuration with a reflector 8;

at least one lighting module 10, also enclosed in the housing, comprising at least one diode lamp. Depending on the desired functioning (signaling, lighting, etc.) and power type of a diode lamp, the lighting module comprises one or more diode lamps;

a connector 7 integral with the housing on which the halogen lamp 9 is mounted by its base, the connector 7 being connected to a connector 4 by a supply beam 5;

the connector 4 allowing the electronic card to be connected to another supply beam 3;

at least one diode lamp control module 11, the module being arranged on the electronic card; and a control device 12 comprising the lighting module 10 and the control module 11 interconnected by a communication beam 6.

In this example, the halogen lamp is used for daytime lighting and the diode lamp is used for night-time lighting. Obviously, these two functions could certainly be performed merely by diode lamps.

The diode lamps of the lighting module are, in non-limiting embodiments, light emitting diodes (LEDs), superluminescent diodes (SLDs) or else a diode laser or organic light emitting diodes (OLEDs).

The remainder of the description will take the example of LEDs. A diode lamp comprises one or more diodes.

The headlamp 1 is connected, in a known manner, to a control unit (not shown) of an on-board network 2 of the vehicle via the supply beam 3. Obviously, it will be noted that the control device 12 can comprise a plurality of lighting modules 10 if, for example, there is a plurality of predefined ranges of diode lamps. A predefined range of a diode lamp is characterized, in particular, by:

a current flow range accepted by the diode lamp for obtaining a brightness flow in a given range;

For example, there will be the following ranges R, S, U with:

R characterized by a current of 350 mA for a brightness flow ranging from 39.8 to 45 Im, S characterized by a current of 350 mA for a brightness flow ranging from 51.7 to 60 Im, and U characterized by a current of 1,000 mA for a brightness flow ranging from 87.4 to 100 Im.

It will be noted that in order to have a reduced flow for a range, the current has merely to be reduced proportionally. Obviously, these are merely examples and there can certainly be other ranges. It will also be noted that a range can be used for one or more LED colors, colors such as white, green, blue, red, etc.

In general, it is the diode lamp suppliers who determine the range to which the diode lamps 101 of a lighting module 10 pertain.

Figure 2:
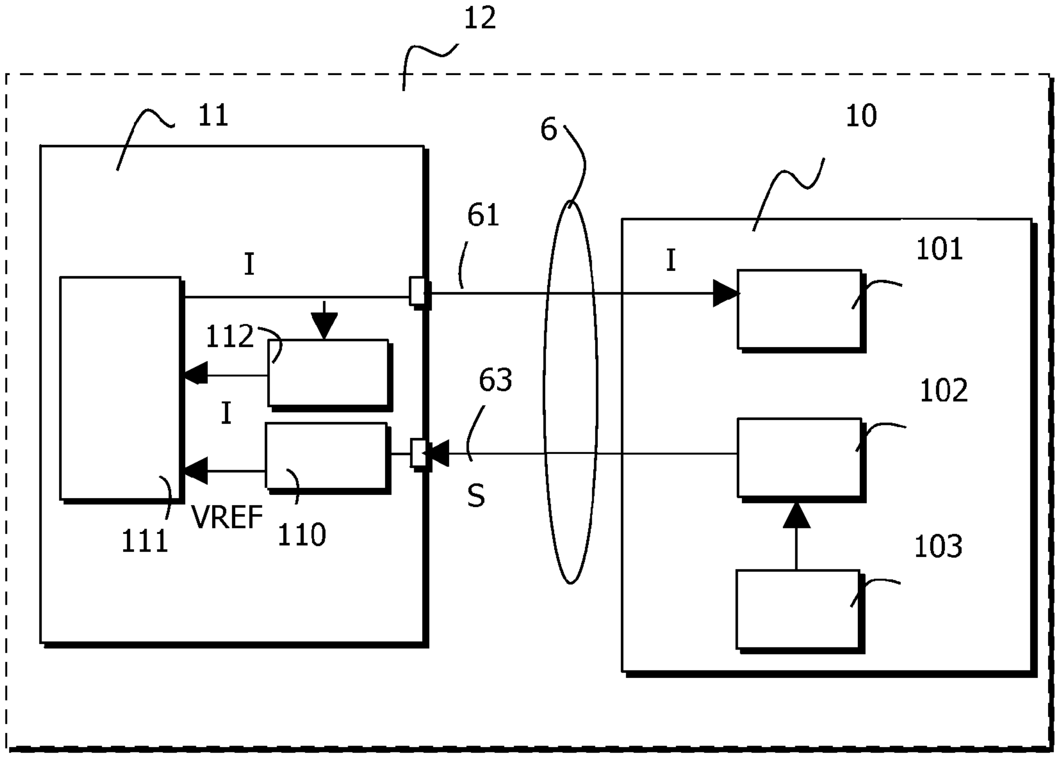
FIG. 2 is a block diagram of a control device according to the invention comprising a lighting module and a control module according to a first embodiment.

The control device 12 is illustrated in a non-limiting manner in the example of FIG. 2. It therefore comprises:

a lighting module 10, a control module 11, and a communication beam 6 allowing communication between the lighting module 10 and the control module 11. In the example of FIG. 2, this communication beam comprises two links 61 and 63.

These three elements will be described hereinafter.

The lighting module 10 comprises:

- one or more diode lamps 101 pertaining to a predefined range; in this example, LED-type lamps,
- a transmission device 102 for transmitting a unique signature S corresponding to a predefined range of the LEDs of the lighting module 10, and
- means (not shown) for receiving a current for powering the diode lamps 101.

In a first non-limiting embodiment, the unique signature S is an analog frequency signal, and more specifically a sinusoidal signal, and the transmission device 102 is, for example, a quartz-type oscillator. A frequency signal of this type prevents electromagnetic disturbances that could be produced on the communication beam 6. For example, for the range R, there will be a sinusoidal signal having a frequency of 1 KHz whereas, for the range S, it will be 2 KHz and, for the range U, 3 KHz.

In a second non-limiting embodiment, the unique signature S is a digital signal. For example, it is a pulse width modulation PWM signal and the associated transmission device 102 is, for example, a microcontroller. Obviously, any other digital signal may be considered, such as for example a binary signal associated with a range R, S or U for example, which signal will, for example, be ASCII-coded.

A microcontroller 102 of this type comprises an EEPROM-type, writable or rewritable non-volatile memory, for example a FLASH memory, so as to program the unique signature S associated with each of the various predefined ranges of diode lamps 101.

In a non-limiting example, if for example there are three lighting modules 10 of predefined ranges R, S and U of diode lamps 101, the microcontroller 102 will be programmed in the following manner:

for the predefined range R, a pulse width modulation PWM signal having a cyclic ratio of between 0 and 30%;

for the predefined range S, a pulse width modulation PWM signal having a cyclic ratio of between 31 and 60%;

for the predefined range U, a pulse width modulation PWM signal having a cyclic ratio of between 61 and 90%.

Use could also be made of a frequency associated with a PWM signal having a cyclic ratio of 50%:

for the predefined range R, an associated frequency of 100 Hz;

for the predefined range S, an associated frequency of 200 Hz;

for the predefined range U, an associated frequency of 300 Hz.

It will be noted that a PWM signal is a fixed-frequency signal and the cyclic ratio corresponds to the time taken to raise the digital signal relative to the period of said PWM signal.

Obviously, these are non-limiting examples and other types of associations with a PWM signal of this type are conceivable, for example not a development by levels of the PWM signal in accordance with the predefined diode lamp range but rather a continuous development, for example by modulating the PWM signal as a function of the temperature of the lighting module 10.

Obviously, these are non-limiting examples of a unique signature S and a combination of signals (for example, a combination of PWM signals) could also be used to establish this unique signature S.

In a non-limiting embodiment, the lighting module 10 further comprises a temperature sensor 103. This sensor will allow the current injected into the lighting module 10 to be adjusted as a function of the temperature of the lighting module, so the lighting module does not overheat, and therefore allows more reliable electronics to be obtained. More specifically, the unique signature S to be transmitted will be chosen no longer merely as a function of the predefined range of the LEDs of the lighting module 10 but also as a function of the temperature of the lighting module 10 as follows.

An adjustment of this type is carried out, in a non-limiting example, in the following manner:

For example, if the lighting module 10 comprises diode lamps 101 from the range R, the microcontroller 102 normally sends the signal PWM1 having a cyclic ratio of 30% in accordance with one of the examples set out hereinbefore.

If the temperature sensor 103 detects a temperature t1 greater than that tolerated tref by the diode lamp range R, the latter value is sent by the sensor 103 to the microcontroller 102.

The microcontroller 102 then sends a signal PWM2 having a cyclic ratio of 100% (continuous signal) so that the current injected into the lighting module 10, and therefore the brightness of the diode lamp range of the lighting module 10, decreases. The diode lamps 101 are thus heated less and there is no risk of the electronics becoming impaired When the detected temperature t1 becomes less than the tolerated temperature tref, the microcontroller 102 sends the signal PWM1 corresponding to the range of the diode lamps of the lighting module 10.

It will be noted that in a non-limiting embodiment, the temperature sensor 103 is arranged on the hottest point of the lighting module 10.

It will be noted that with this temperature sensor device 103, a minimum current will nevertheless be ensured for the diode lamps 101 to transmit a minimum brightness.

The control module 11, also known as a driver, comprises for its part means 110-111-112 for converting the transmitted unique signature S into a current value I suitable for powering the lighting module 10 in accordance with the diode lamp range 101.

According to a first non-limiting embodiment shown in FIG. 2, the control module 11 comprises:

a low-pass filter 110 or else a digital/analog converter 110, etc., for filtering the unique signature S (received by the control module 11 via the communication line 63) so as to obtain an analog voltage signal VREF, this voltage signal serving as a voltage reference;

current measuring means 112 for measuring the current I injected into the lighting module 10 and for re-injecting the current thus measured at the input of current adjustment means 111 (the measuring means 112 thus comprise a shunt on the communication line 61 associated with a current mirror, for example);

means 111 for adjusting the current I injected into the lighting module that allow:

the reference voltage signal VREF to be converted into a reference current value IREF; the means 111 accordingly comprise a voltage-to-current converter (not shown), this voltage converter being compatible with all diode lamp ranges;

this first current value IREF to be compared with the current I injected into the lighting module 10; the means 111 accordingly comprise a comparator (not shown); and the current I to be adjusted and supplied in the lighting module 10 as a function of this comparison; the means 111 accordingly comprise a transistor power circuit (not shown);

The control module according to this second embodiment can be used in the case of the example of a unique signature in the form of a PWM signal calculated as a function of the current flow associated with the desired diode lamp range of the lighting module. The microcontroller 102 of the lighting module will be programmed to transmit PWM signals of this type.

Figure 3:
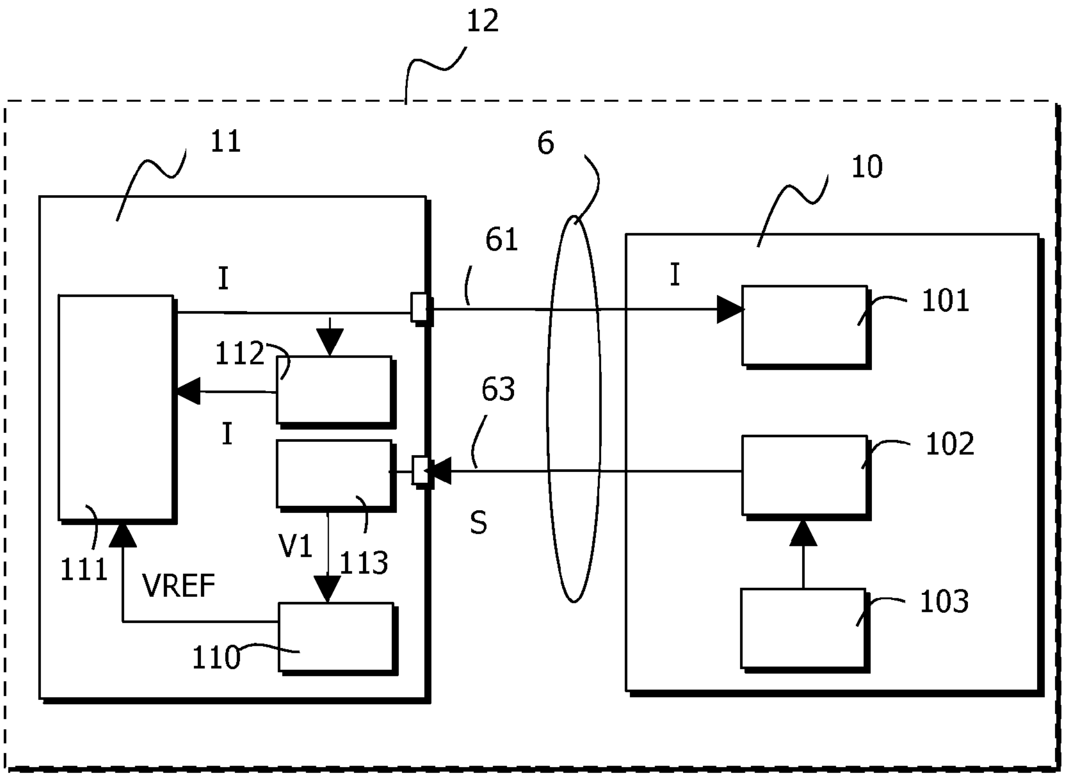
FIG. 3 is a block diagram of a control device according to the invention comprising a lighting module and a control module according to a second embodiment.

According to a second non-limiting embodiment shown in FIG. 3, the control module 11 comprises:

the same elements as in the case of the first embodiment; and a microcontroller 113 for receiving the unique signature S transmitted by the transmission device 102 of the lighting module 10 and converting this signature into a first voltage V1 as a function of the diode lamp range of the lighting module 10. This microcontroller 113 will also be programmed. This first voltage V1 will be transmitted at the input of the low-pass filter 110.

The control module according to this second embodiment can be used in the case of the example of a unique signature in the form of a PWM signal having a cyclic ratio of 30%, 60% and 90% in accordance with the diode lamp range.

The communication beam 6 between the lighting module 10 and the control module 11 allows:

- a unique signature S to be transmitted from the lighting module 10 to the control module 11, and
- a current Ito be transmitted from the control module 11 to the lighting module 10 to cause the diode lamps 101 to operate.

For this purpose, according to a first non-limiting embodiment, the communication beam comprises two links 61 and 63, for communicating the unique signature S and the current I respectively. In non-limiting embodiments, the first link 61 can be:

a direct single-line link, an SPI (serial programming interface) or LIN (local interconnect network)-type low-speed single-line link if, for example, an SPI or LIN-type communication protocol is used between the lighting module 10 and the control module 11, a CAN (controller area network)-type multiple-line link if, for example, a CAN-type communication protocol is used between the lighting module 10 and the control module 11.

For example, in a non-limiting manner, the direct single-line link will be used for sending a sinusoidal or PWM signal-type unique signature, whereas an LIN, SPI or CAN link can be used for sending an ASCII-coded, binary-type unique signature. Obviously, other types of protocols, and therefore links, can be used.

Having seen the structure of the control device 12 of a lighting module, it will be examined hereinafter how the diode lamps 101 are lit via the above-described elements of the control device 12.

In the following non-limiting example, the lighting module 10 is associated with the vehicle side marker lights. Obviously, it can be associated with signaling or other lights.

In a first step, the lighting module 10, like the transmission device 102, is switched on with a first suitable current level, for example, in the present case, a current lower than the lowest diode lamp range and also suitable for switching on the microcontroller. Both the diode lamps 101 and the microcontroller 102 are thus switched on. There is therefore no need to have a separate power supply for the microcontroller 102.

It will be noted that, in practice, the lighting module is switched on either manually, if for example the user of the vehicle decides to switch on his side marker lights and actuates the button provided for this purpose on the vehicle dashboard, or automatically if the side marker lights are illuminated automatically when passing through a tunnel or when it becomes dark in the evening, for example.

In a second step, the transmission device 102 sends the unique signature S associated with the diode lamp range from the lighting module 10 to the control module 11 via the communication link 61 provided for this purpose.

In a third step, the control module 11 then supplies, as a function of the unique signature S received, a second current level I, corresponding to the diode lamp range present, via the communication link 63.

According to non-limiting embodiments, there can be provided:

a refreshing of the signature S for a dependability question; provision can therefore be made for the transmission device 102 then periodically to send the unique signature S associated with the diode lamp range 101, or else a refreshing of the signature S as a function of the temperature t1 associated with the diode lamp range 101 as seen hereinbefore.

Thus, in the aforementioned examples, the transmission device 102 allows the supply of a unique signature S associated with the diode lamp range of the lighting module 10 or optionally, taking account of a given temperature, a suitable unique signature. It will be noted that this transmission device 102—for example, when it is a microcontroller—can also be used for other functions, in non-limiting examples, such as an item of information for carrying out LED multiplexing or a diagnostic function. For example, if an LED series of the lighting module 10 is used for a flashing function, whereas another LED series of the same module 10 is used for a daytime running light (DRL) function, the transmission device 102 will then transmit, in addition to the unique signature S, for example, an item of information CONF concerning the configuration of the LEDs to be adopted as a function of the desired operations; i.e. an item of information concerning the fact that the first LEDs will have to be periodically supplied with current to carry out the flashing function, whereas the second LEDs will always have to be supplied with current continuously to carry out the signaling function.

Figure 4:
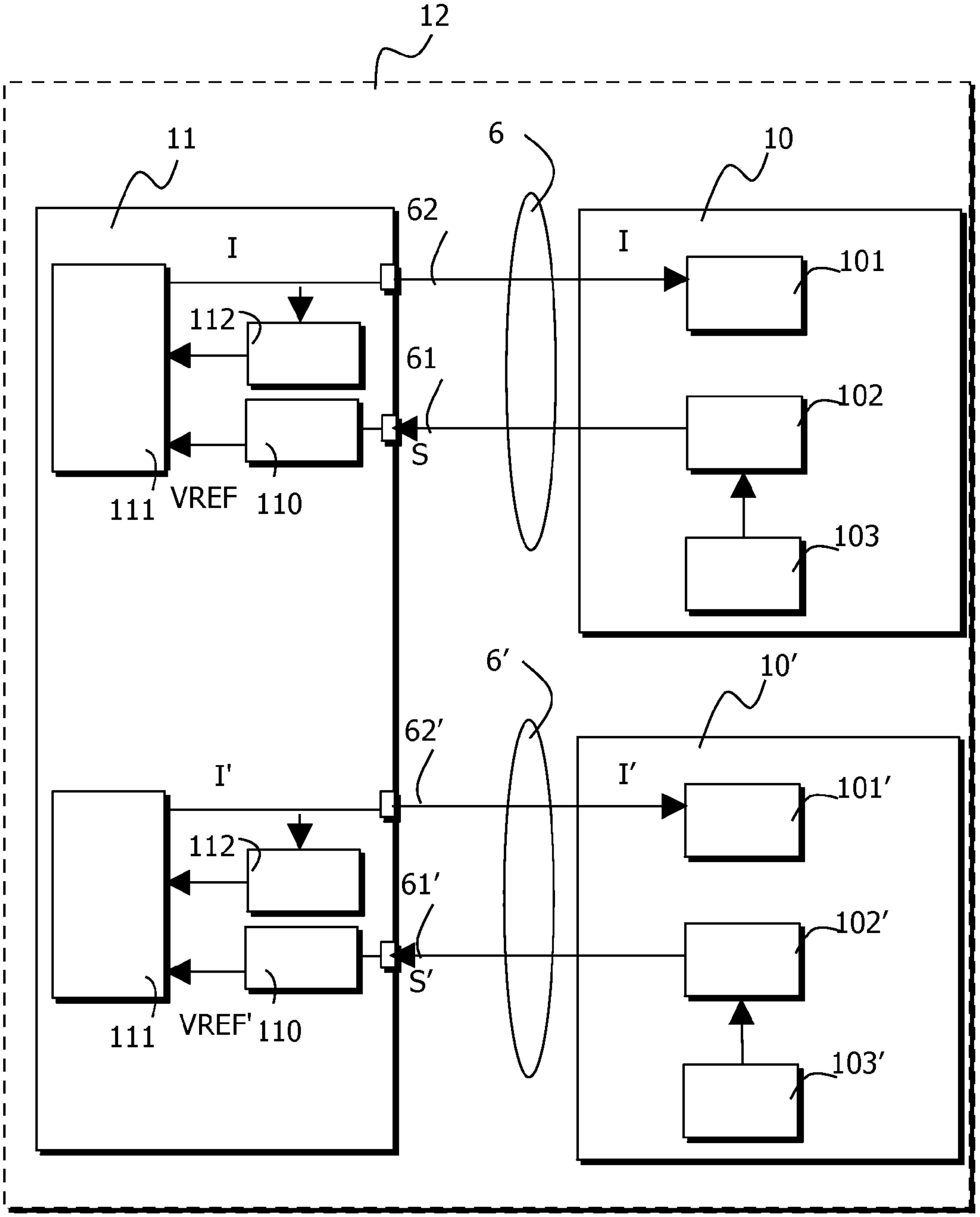
FIG. 4 shows a variation of the control device of FIG. 2.

It will be noted that the foregoing examples have been provided with a lighting module 10 of a diode lamp range, but that which was stated hereinbefore can obviously also apply to a plurality of lighting modules 10 of a single range or differing ranges of diode lamps. In a non-limiting embodiment, there will therefore be a single control module 11 allowing all of the lighting modules 10 to be controlled as illustrated in FIG. 4 in which there are two lighting modules 10 and 10'.

The invention thus has the following advantages.

Firstly, it allows the electromagnetic problems caused by the various electrical components of the vehicle to be dispensed with. More specifically, protection is provided against problems of conducted susceptibility, in the communication-line beam, known as BCI (bulk current injection), corresponding to the electromagnetic radiation of said beam, and of radiated susceptibility in the communication-line beam (SR), which is produced by the disturbances caused by the electronic components located in the vicinity of the beam, whatever the frequency or amplitude of the injected current.

Secondly, it allows the problems of specific configuration for a control module to be dispensed with each time that there is one or more differing lighting modules in a vehicle light. A control module could thus easily be used with any lighting module having a differing diode lamp range and a lighting module could easily be used with any control module, since the current that has to be sent to the lighting module is known precisely owing to the unique signature of the lighting module. Matching between a lighting module and the associated control module thereof is thus facilitated.

Thirdly, an excessive number of connectors on the control module is avoided, thus reducing the material cost.

Finally, it is a simple solution that is inexpensive to implement.

While the form of apparatus herein described constitute a preferred embodiment of this invention, it is to be understood that the invention is not limited to this precise form of apparatus, and that changes may be made therein without departing from the scope of the invention which is defined in the appended claims.

What is claimed is:

1. A module for controlling a lighting module comprising at least one diode lamp pertaining to a predefined range of diode lamps, comprising:

reception means for receiving a unique signature transmitted by said lighting module and representing said predefined range of diode lamps; and current adjustment means for adjusting and supplying, as a function of said transmitted unique signature, a current to said lighting module to cause said predefined range of diode lamps to operate;

wherein said unique signature transmitted by said lighting module is an analog frequency signal, a digital signal or a pulse width modulation signal and in that said unique signature cooperates with said lighting module via a communication beam;

said control module further controlling a second lighting module is intended to receive a second signature representing a predefined range of at least one diode lamp of said second lighting module.

2. A module for controlling a lighting module comprising at least one diode lamp pertaining to a predefined range of diode lamps, comprising:

reception means for receiving a unique signature transmitted by said lighting module and representing said predefined range of diode lamps, and current adjustment means for adjusting and supplying, as a function of said transmitted unique signature, a current to said lighting module to cause said lamp to operate, wherein said current adjustment means comprises a transmission device for transmitting said unique signature, said unique signature transmitted by said transmission device being an analog frequency signal, a digital signal or a pulse width modulation signal and in that said unique signature cooperates with said lighting module via a communication beam.

3. The control module according to claim 2, wherein said reception means also allows the transmitted unique signature to be converted into a reference voltage value intended to be used by the current adjustment means.

4. The control module according to claim 2, wherein the current adjustment means comprises a voltage-to-current converter and a comparator.

5. The control module according to claim 2, wherein the current adjustment means allows a current to be supplied to said transmission device of said control module intended to transmit the unique signature.

* * * * *